United States Patent
Park et al.

(10) Patent No.: US 8,910,074 B2
(45) Date of Patent: Dec. 9, 2014

(54) SYSTEM AND METHOD FOR PERFORMING AUTO SCROLL

(75) Inventors: Jung Woo Park, Seoul (KR); Woong Sub Kim, Seoul (KR); Kee Duk Park, Seongnam-si (KR); Se Kwon, Seoul (KR)

(73) Assignee: NHN Corporation, Seongnam-si (KR)

( * ) Notice: Subject to any disclaimer, the term of this patent is extended or adjusted under 35 U.S.C. 154(b) by 680 days.

(21) Appl. No.: 12/905,486

(22) Filed: Oct. 15, 2010

(65) Prior Publication Data

US 2011/0093811 A1    Apr. 21, 2011

(30) Foreign Application Priority Data

Oct. 15, 2009   (KR) .................. 10-2009-0098180

(51) Int. Cl.
*G06F 3/048* (2013.01)
*G06F 3/0485* (2013.01)
*G06F 3/0484* (2013.01)

(52) U.S. Cl.
CPC ............ *G06F 3/0485* (2013.01); *G06F 3/0484* (2013.01); *G06F 3/04855* (2013.01)
USPC .......................................... 715/785; 715/784

(58) Field of Classification Search
CPC .. G06F 3/0485; G06F 3/0484; G06F 3/04855
USPC .................................. 715/785, 784
See application file for complete search history.

(56) References Cited

U.S. PATENT DOCUMENTS

| | | | | |
|---|---|---|---|---|
| 5,796,952 A | * | 8/1998 | Davis et al. | 709/224 |
| 6,957,769 B2 | * | 10/2005 | Hepworth et al. | 235/375 |
| 8,438,496 B1 | * | 5/2013 | Hegde | 715/785 |
| 2002/0087509 A1 | * | 7/2002 | Meirsonne | 707/1 |
| 2003/0105677 A1 | * | 6/2003 | Skinner | 705/26 |
| 2004/0041847 A1 | * | 3/2004 | Lai et al. | 345/862 |

FOREIGN PATENT DOCUMENTS

| | | | |
|---|---|---|---|
| JP | 2003281141 A | * | 10/2003 |
| JP | 2008-225783 | | 9/2008 |
| JP | 2008225783 A | * | 9/2008 |

* cited by examiner

*Primary Examiner* — William Bashore
*Assistant Examiner* — Gregory A Distefano
(74) *Attorney, Agent, or Firm* — Greer Burns & Crain Ltd.

(57) ABSTRACT

Provided is a system and method for performing an auto scroll. The system for performing the auto scroll may include an auto scroll determination unit to determine whether to perform the auto scroll on a page, an auto scroll performing unit to perform the auto scroll on the page so that a main text of the page may be obtained with focus, and a page providing unit to output the auto scrolled page. According to exemplary embodiments of the present invention, even though a user does not manually scroll to data of the page to be viewed, the data of the page may automatically be scrolled so that the data may be obtained with focus.

11 Claims, 6 Drawing Sheets

SYSTEM AND METHOD FOR PERFORMING AUTO SCROLL

CROSS-REFERENCE TO RELATED APPLICATION

This application claims priority from and the benefit of Korean Patent Application No. 10-2009-0098180, filed on Oct. 15, 2009, which is hereby incorporated by reference for all purposes as if fully set forth herein.

BACKGROUND OF THE INVENTION

1. Field of the Invention

Exemplary embodiments of the present invention relate to a system and method for providing auto scroll, and more particularly, to a system and method for providing auto scroll capable of focusing a main text of a page.

2. Description of the Background

When accessing a website, a main text of a web page including a document is often required to be pushed down because of images incorporated with the web page, typically located on a top portion of the web page of the website. Consequently, a user may need to scroll down the web page using an input device such as a mouse to view the main text of the web page.

Since it is inconvenient to move down the page to verify the main text every time the user accesses the web page, this inconvenience is challenging to the user for accessing the page to visit text messages.

Accordingly, when the main text is pushed down because of the image on the page, a method for directly verifying the main text without being moved to a lower portion of the page by the user is desired.

SUMMARY OF THE INVENTION

Exemplary embodiments of the present invention provide a system and method for providing an auto scroll capable of viewing a main text of a page without moving to a lower portion of the page.

Exemplary embodiments of the present invention provide an apparatus. The apparatus includes an auto scroll determination unit to determine whether to perform the auto scroll of a page. The apparatus further includes an auto scroll performing unit to perform the auto scroll of the page to focus a main text of the page. The apparatus includes a page providing unit to provide the auto scrolled page.

Exemplary embodiments of the present invention provide a method. The method includes determining whether to perform the auto scroll on a page. The page includes image data and text data, and each of the image data and the text data locates the respective regions of the page, wherein data of the page is automatically scrolled and being displayed to a user is according to according to source code of the page. The determination is processed associated with identifying of auto scrolling data with respect to each location of the image data and text data; and outputting auto scrolled data of the page.

Exemplary embodiments of the present invention also provide a device. The device includes a processor configured to determine whether to perform an auto scroll on a page. The page includes image data and text data and each image data and text data locates the respective regions of the page, wherein data of the page is automatically scrolled and being displayed to a user according to source code of the page. The determination is processed associated with identifying of auto scrolling data with respect to each location of the image data and text data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Hereinafter, exemplary embodiments of the present invention are described in more detail with reference to accompanying drawings. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 1:
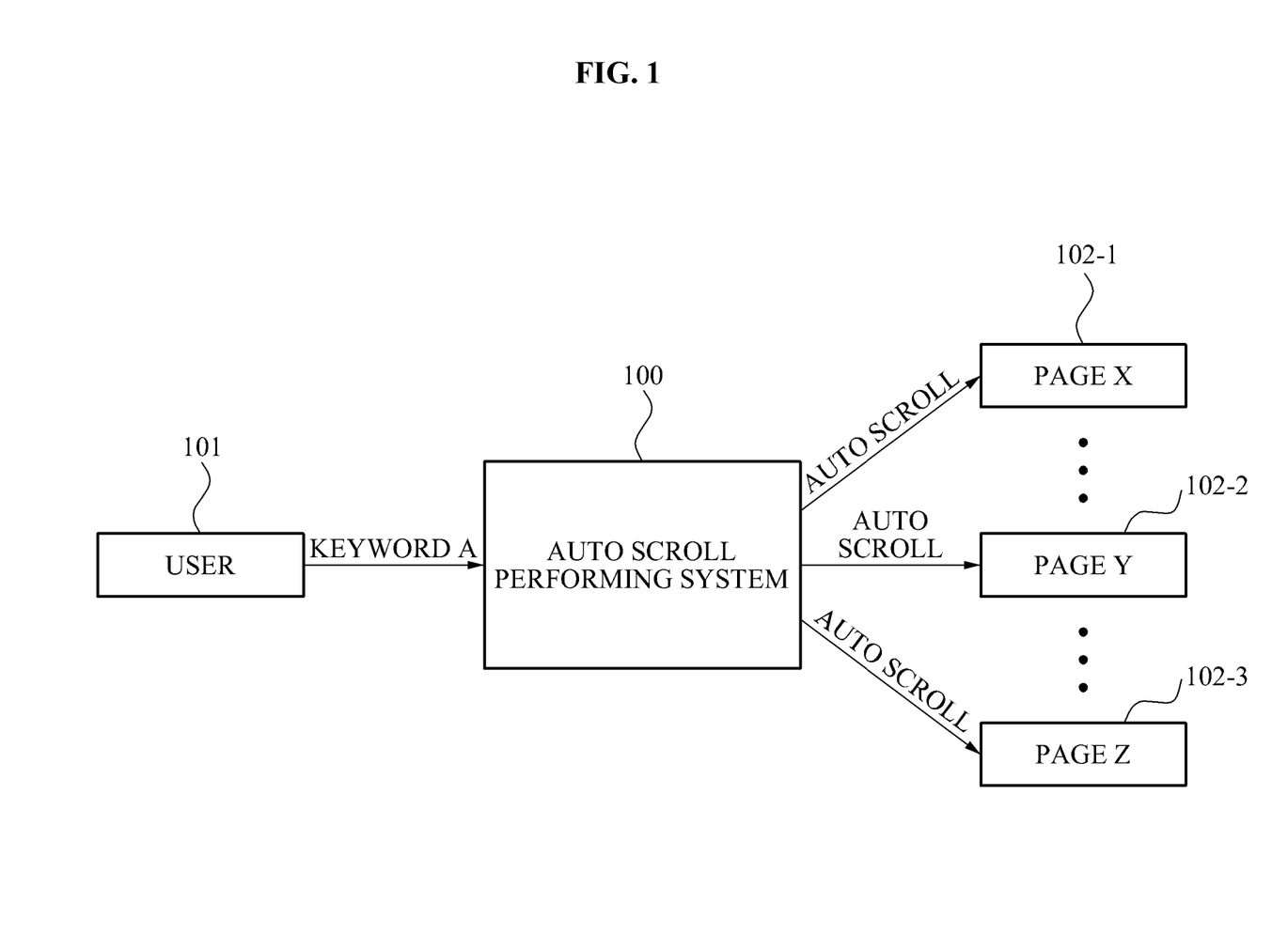
FIG. 1 is a diagram illustrating an operation of an auto scroll system according to exemplary embodiments of the present invention.

FIG. 1 is a diagram illustrating an operation of an auto scroll system 100 according to exemplary embodiments of the present invention.

Referring to FIG. 1, the auto scroll system 100 may receive, from a user 101, an input 'keyword A' for a site search. Then, the auto scroll system 100 may search for, using the 'keyword A,' related pages and expose the pages accessible by a user.

According to exemplary embodiments, although not shown in FIG. 1, when the is user 101 inputs the 'keyword A' into a search server, the search server may search for a matched page having the 'keyword A.' In this example, the auto scroll system 100 may receive the page via the search server.

When the user 101 clicks on a link of the page that is retrieved as a result of a search of a blog or an Internet cafe, typically an uppermost portion of the page can be exposed. Accordingly, to view a main text of the page, the user 101 may need to scroll down the page on the browser using an input device such as a keyboard, a mouse, thereby causing an inconvenience to the user 101. When the user 101 clicks on the search result of the blog or the Internet cafe, the auto scroll system 100 may perform an auto scroll and arrive the main text on the page so that the user 101 may directly view the main text of the page without scrolling down to access the main text.

The auto scroll system 100 may determine whether to perform the auto scroll on retrieved pages, for example, 'a page X' 102-1, 'a page Y' 102-2, and 'a page Z' 102-3 (hereinafter, page X, page Y, and page Z). For example, the auto scroll system 100 may determine whether to perform the auto scroll on the page X, page Y, and page Z based on source code of the page X, page Y, and page Z.

When the auto scroll is determined to be performed on the page X, page Y, and page Z, the auto scroll system 100 may perform the auto scroll on the page X, page Y, and page Z to focus the main text. For example, when the main text of each of the page X, page Y, and page Z is needed to be pushed down due to images, videos or other digital image data disposed in an upper portion of the page, the auto scroll system 100 may execute the auto scroll on the page X, page Y, and page Z, thereby rendering the main text be disposed on an upper portion.

When the user 101 accesses the pages page X, page Y, and page Z, the page X, is page Y, and page Z may automatically be scrolled whereby the main text of the page X, page Y, and page Z can be viewed with a focus to the user 101.

Figure 2:
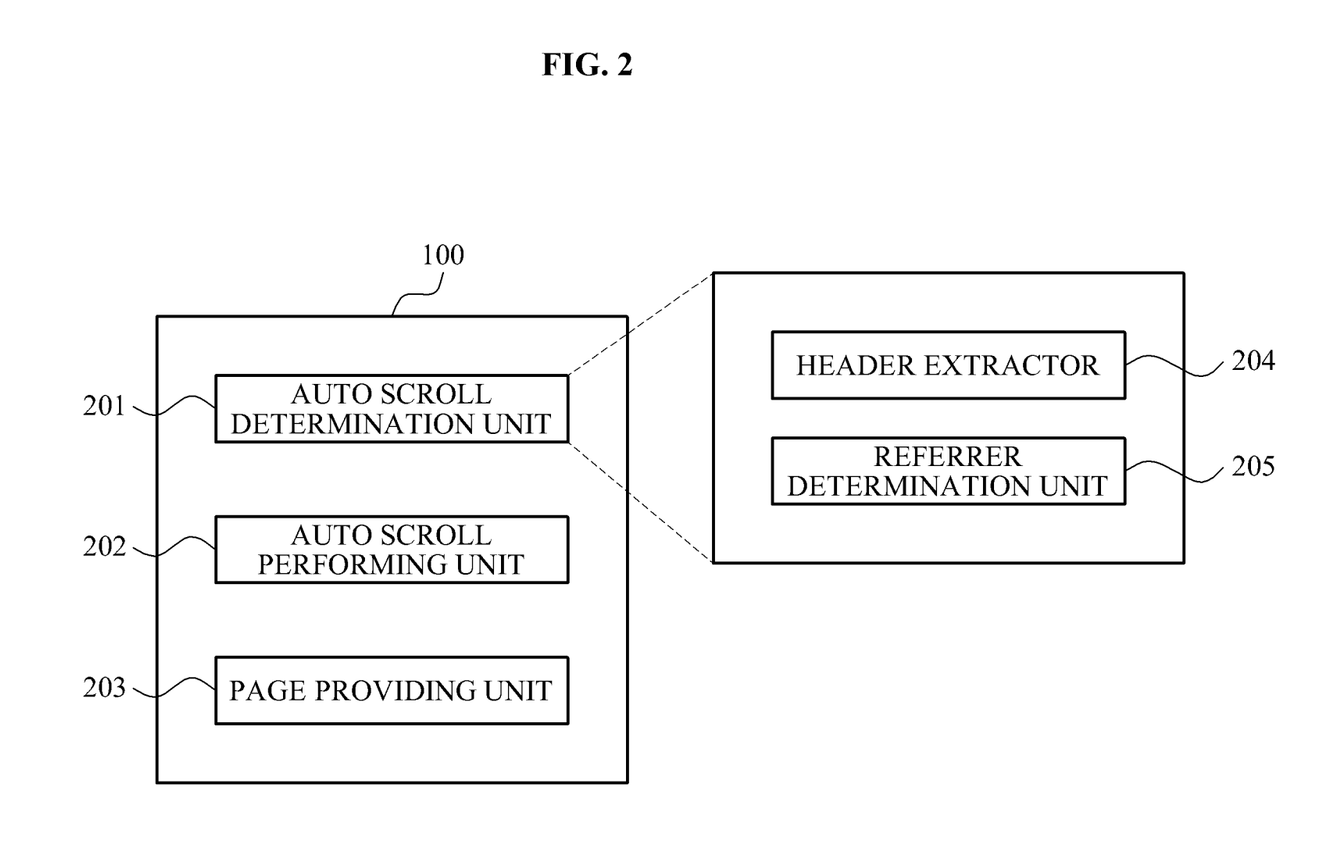
FIG. 2 is a diagram illustrating a configuration of the auto scroll system of FIG. 1.

FIG. 2 is a diagram illustrating a configuration of the auto scroll system 100 of FIG. 1.

Referring to FIG. 2, the auto scroll system 100 may include an auto scroll determination unit 201, an auto scroll performing unit 202, and a page providing unit 203.

The auto scroll determination unit 201 may determine whether to perform the auto scroll on a page. For example, the auto scroll determination unit 201 may determine whether to perform the auto scroll on a page based on a source code of the page.

For example, the auto scroll system 100 may determine whether to perform the auto scroll with respect to not only a page serviced by the auto scroll system 100 but a page serviced by an operating entity, which is different from an operating entity of the auto scroll system 100. Since there is no limitation of type of the pages processed by the auto scroll system 100, the auto scroll system 100 may determine whether to perform the auto scroll for any type of pages.

The auto scroll determination unit 201 may include a header extractor 204 and a referrer determination unit 205.

The header extractor 204 may extract a header included in a source code of the page. For example, when the page includes Hyper Text Markup Language (HTML) source code, the header extractor 204 may extract, from the HTML source code, a header corresponding to a text between a <head> tag and a </head> tag. The source code of the page may not be limited to the HTML source code, and source code including another programming language may be substituted for the HTML source code.

The referrer determination unit 205 may determine whether a referrer included in the header includes a predetermined character string by reading the referrer. For example, the referrer determination unit 205 may determine whether the referrer includes a character string indicating a page search site. In this example, the page may correspond to a page that includes instructions on configuring a blog or an Internet cafe.

For example, the referrer determination unit 205 may determine whether the referrer includes a character string indicating a page search site such as 'search.naver.com.' The referrer determination unit 205 may determine, based on the referrer, whether a page generation request is received from the page search site that provides a search result of a blog or an Internet cafe. The page generation request may occur by clicking, by the user, on a page link that is provided as the search result of the blog or the Internet cafe. When the page generation request is a request received from the page search site, the auto scroll determination unit 201 may determine whether to perform the auto scroll on the page.

For example, in a case of the page serviced by the auto scroll system 100, the referrer may be analyzed by directly analyzing the source code of the page. However, in a case of a page serviced by an operating entity serviced by other than the auto scroll performing system 100, such as a personal domain server, since the referrer is not verified in the source code of the page, a referrer value of the page may be received from the personal domain server. Then, the auto scroll system 100 may determine whether to perform the auto scroll on the page based on the referrer received from the personal domain server.

The auto scroll performing unit 202 may perform the auto scroll on the page for which the auto scroll is to be performed so that the main text of the page may be focused. For example, the auto scroll performing unit 202 may perform the auto scroll on the page by adding a is parameter for the auto scroll to a uniform resource locator (URL) of the page. When the URL of the page is 'www.abc.com/index.html,' the auto scroll performing unit 202 may generate 'www.abc.com/index.html/xyz' by adding a parameter 'xyz' to the URL. The parameter may indicate that a corresponding page is a page for which the auto scroll is performed.

Then, the auto scroll performing unit 202 may perform the auto scroll by applying a scroll view function to the page corresponding to the URL to which the parameter is added, thereby a tag location indicating the main text on the page may be focused. For example, the auto scroll performing unit 202 may perform the auto scroll by using a scrolltoview( ) function of JavaScript so that a <div> tag indicating the main text of the page may be focused.

In this example, the scroll view function may perform the auto scroll based on a pixel of the page displayed through a browser. For example, the auto scroll performing unit 202 may perform the auto scroll based on a size occupied by a skin image of the page, a size occupied by the main text, a size of an area where the page is displayed on the browser, and a resolution of a display where the browser is displayed. Then, the auto scroll performing unit 202 may scroll the main text of the page to an upper portion of the page based on a pixel unit so that the main text of the page may be focused through the browser.

The page providing unit 203 may provide the auto scrolled page. For example, a page on which the main text being focused by the auto scroll is provided to a user without moving to the main text of the page by using an input device.

Figure 3:
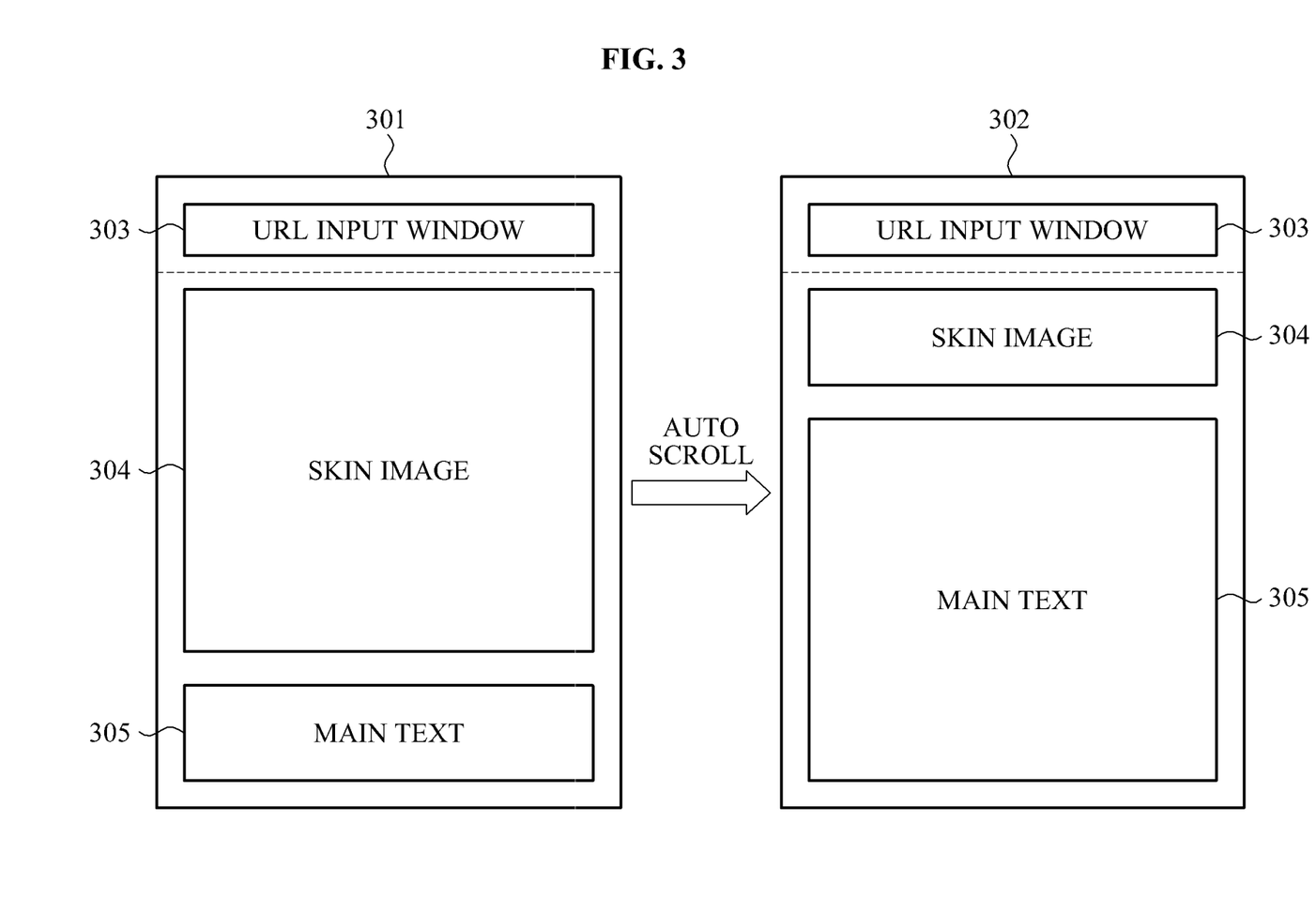
FIG. 3 is a diagram illustrating an auto scroll associated with a page according to exemplary embodiments of the present invention.

FIG. 3 is a diagram illustrating an auto scroll associated with a page according to exemplary embodiments of the present invention.

FIG. 3 illustrates a browser where pages 301 and 302 are exposed. Referring to FIG. 3, the page 301 exposed through the browser may include a URL input area 303, a skin image 304, and a main text 305. In this example, the URL input area 303 may be fixed on the pages 301 and 302.

For the page 301, the main text 305 may be disposed in a lower portion of the page 301 due to the skin image 304. In some examples, only the skin image 304 may be exposed to the user. Accordingly, the user may need to move the main text 305 to an upper portion of the browser window by moving to a lower portion of the page 301 using an input device such as a mouse, or a keyboard to verify the main text.

According to exemplary embodiments of the present invention, when a referrer of a source code of the page 301 includes a character string indicating a page search site, an auto scroll system 100 may process to perform the auto scroll on the page 301. When the page 301 is generated by a request that is received from the page search site, the auto scroll system 100 may process to perform the auto scroll on the page 301.

When the user accesses the page 301, the page 301 may automatically be scrolled without an additional operation of moving to the main text 305 of the page 301 by the user. Referring to the page 302, the page 301 may automatically be scrolled so that the main text 305 of the page 301 may be disposed in a portion that can be viewed by the user.

Figure 4:
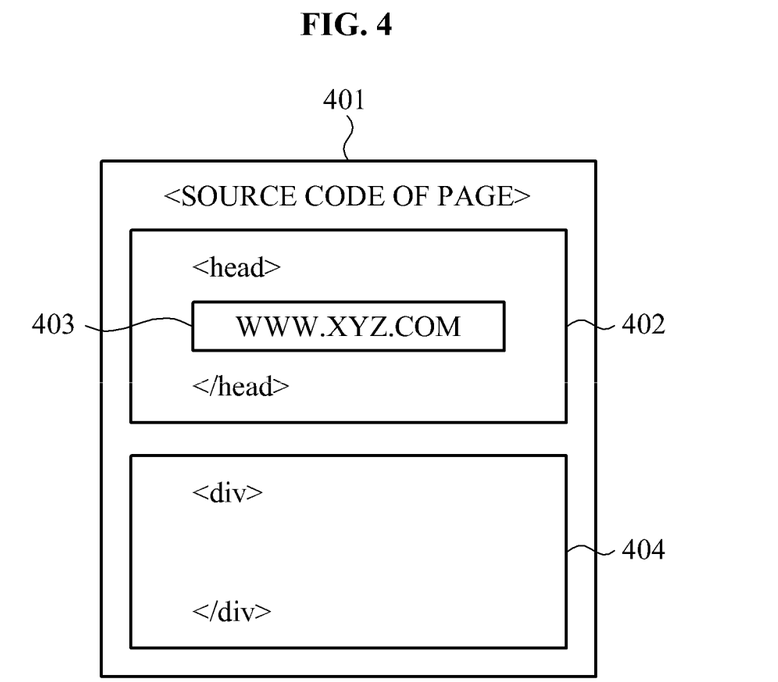
FIG. 4 is a diagram illustrating source code of a page according to exemplary embodiments of the present invention.

FIG. 4 is a diagram illustrating source code of a page according to exemplary embodiments of the present invention.

Source code of a page 401 may be divided into source code 402 indicating a header area and source code 404 indicating a main text. The source code 402 may include a general item of the page 401. For example, the source code 402 may include metadata read by a search engine such as a title of the page 401, a writer of the text, a description, and a keyword, and an item about a style such as content of a script, a font, a link, and a length between strings.

When the page 401 is accessed though a page search site, the source code 402 indicating the header area may include a character string indicating a page search site. An auto scroll system 100 may determine whether the character string indicating the page search site 'www.xyz.com' is included in a referrer 403 of the source code 402 by reading the referrer 403.

When the page 401 includes the character string indicating the page search site in the referrer 403, the auto scroll system 100 may perform an auto scroll on the page 401 so that the main text of the page 401 may be focused. Here, the auto scroll system 100 may perform the auto scroll so that a tag location indicating the main text may obtain focus, by applying a scroll view function to the page. As described, the auto scroll system 100 may perform the auto scroll by using a scrolltoview( ) function of JavaScript to obtain a focus on a <div> tag indicating the main text of the page 401.

Figure 5:
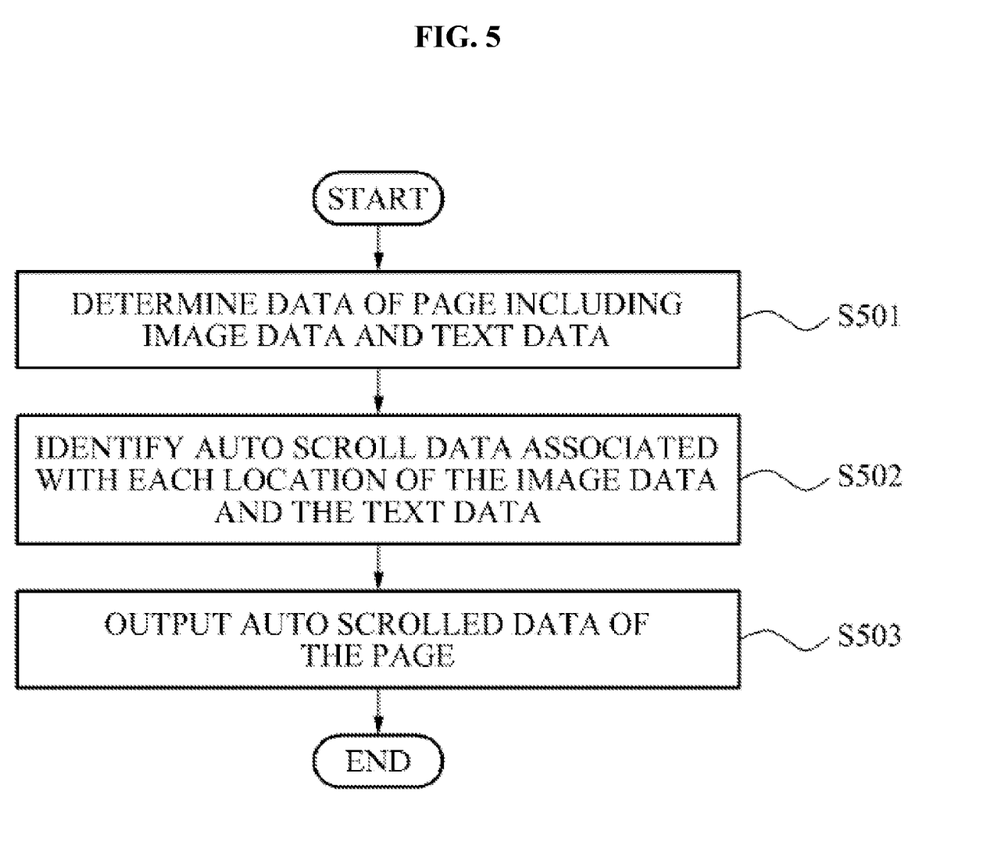
FIG. 5 is a flowchart of a process for providing an auto scroll according to exemplary embodiments of the present invention.

FIG. 5 is a flowchart of a process for providing an auto scroll according to exemplary embodiments of the present invention.

As in step S501, an auto scroll system 100 may determine whether to perform an auto scroll of a page. The page may include image data and text data. For example, the auto scroll system 100 may determine whether to perform the auto scroll of the page based on source code of the page.

In some examples, the auto scroll system 100 may determine whether to perform the auto scroll not only with respect to a page serviced by the auto scroll system 100, but also with respect to a page serviced by an operating entity which is different from an operating entity of the auto scroll system 100. Since types of pages processed by the auto scroll system 100 are not limited, the auto scroll system 100 may determine whether to perform the auto scroll with respect to any types of pages.

For example, the auto scroll system 100 may extract a header included in the source of the page. The auto scroll performing system 100 may determine whether a referrer of the header includes a predetermined character string by reading the referrer. The auto scroll system 100 may determine whether the referrer includes a character string indicating a page search site. Here, the page may correspond to a page that includes instructions for configuring a blog or an Internet cafe.

In step S502, the auto scroll system 100 may perform the auto scroll on the page so that the main text of the page may be focused. For example, auto scrolling may be performed based on identifying auto scroll data associated with each location of the image data and the text data of the page.

In some examples, the auto scroll system 100 may perform the auto scroll of the page by adding a parameter to a Uniform Resource Locator (URL) of the page for auto scrolling.

The auto scroll performing system 100 may perform the auto scroll by applying a scroll view function to the page so that a tag location indicating the main text on the page may be focused. For example, the auto scroll performing system 100 may perform the auto scroll by using a scrolltoview( ) function of JavaScript so that a <div> tag indicating the main text of the page may obtain focus.

In step S503, the auto scroll system 100 may output the auto scrolled page. The user may not move to the main text by using an input device such as a mouse, and a keyboard. Instead, the page may automatically be scrolled when the user accesses the page, enabling the user to view the main text of the page.

One of ordinary skill in the art would recognize that the processes for providing frequency reuse may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 6.

Figure 6:
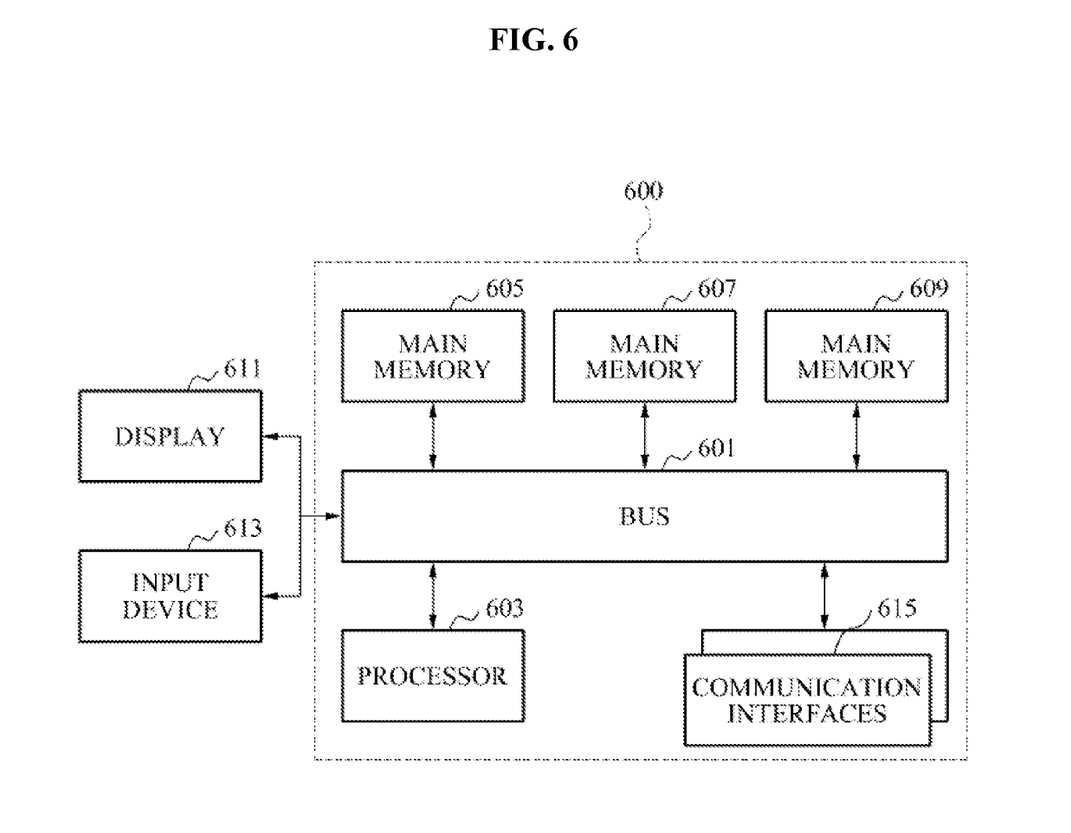
FIG. 6 is a diagram of hardware that can be used to implement exemplary embodiments of the present invention.

FIG. 6 illustrates exemplary hardware upon which various embodiments of the invention can be implemented. A computing system 600 includes a bus 601 or other communication mechanism for communicating information and a processor 603 coupled to the bus 601 for processing information. The computing system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computing system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computing system 600 may be coupled with the bus 601 to a display 611, such as a liquid crystal display, or active matrix display, for displaying information to a user. An input device 613, such as a keyboard including alphanumeric and other keys, may be coupled to the bus 601 for communicating information and command selections to the processor 603. The input device 613 can include a cursor control, such as a mouse, a trackball, or cursor direction keys, for communicating direction information and command selections to the processor 603 and for controlling cursor movement on the display 611.

According to various embodiments of the invention, the processes described herein can be provided by the computing system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 600 also includes at least one communication interface 615 coupled to bus 601. The communication interface 615 provides a two-way data communication coupling to a network link (not shown). The communication interface 615 sends and receives electrical, electromagnetic, or optical signals that carry digital data streams representing various types of information. Further, the communication interface 615 can include peripheral interface devices, such as a Universal Serial Bus (USB) interface, a PCMCIA (Personal Computer Memory Card International Association) interface, etc.

The processor 603 may execute the transmitted code while being received and/or store the code in the storage device 609, or other non-volatile storage for later execution. In this manner, the computing system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An apparatus to perform an auto scroll of a page having an image data and a main text data, the apparatus comprising:
   a processor; and
   a storage device having one or more instruction units, executable by the processor, the one or more units including,
   an auto scroll determination unit configured to read a referrer from a header of a source code of the page and determine whether the referrer includes a character string indicating a page search site, the page search site indicating that the page having the image data and the main text data is generated through a page generation request from a user selecting a link corresponding to the page having the image data and the main text data;
   wherein the auto scroll determination unit determines performing the auto scroll when the referrer includes the page search site;
   an auto scroll performing unit configured to add a parameter to a URL of the page having the image data and the main text data indicating that the page is to be auto scrolled, and to perform the auto scroll of the page to focus on the main text of the page based on the parameter in the URL; and
   a page providing unit configured to provide the auto scrolled page.

2. The apparatus of claim 1, further comprising:
   a header extractor configured to extract the header of the source code of the page, and a referrer determination unit configured to determine whether the referrer of the header includes the character string.

3. The apparatus of claim 2, wherein the page comprises instructions associated with configuring a blog or an Internet cafe.

4. The apparatus of claim 1, wherein a tag location indicating the main text data of the page is automatically scrolled to focus the main text data by applying a scroll view function to the page.

5. A method for performing an auto scroll of a page, comprising:
   reading a referrer from a header of a source code of the page, the page having image data and text data, each of the image data and the text data being located at the respective regions of the page;
   determining whether the referrer includes a character string indicating a page search site, the page search site indicating that the page having the image data and the text data is generated through a page generation request from a user selecting a link corresponding to the page having the image and the main text;
   determining performing the auto scroll when the referrer includes the page search site;
   performing the auto scroll of the page by adding a parameter to a URL of the page, wherein the page is auto scrolled based on the parameter in the URL; and
   outputting auto scrolled data of the page.

6. The apparatus of claim 1, wherein the auto scroll performing unit is configured to perform the auto scroll based on a pixel of the page displayed through a browser.

7. The method of claim 5, further comprising:
extracting the header of the source code of the page.

8. The method of claim 5, wherein the page comprises instructions associated with configuring a blog or an Internet cafe.

9. The method of claim 5, further comprising:
performing the auto scrolling by applying a scroll view to the page, wherein a tag location indicating the text data of the page being displayed to the user is focused.

10. A non-transitory computer-readable medium comprising an executable program, which when executed by a processor, performs the following method:
reading a referrer from a header of a source code of a page, the page having image data and text data, each of the image data and the text data being located at the respective regions of the page; and
determining whether the referrer includes a character string indicating a page search site, the page search site indicating that the page having the image data and the text data is generated through a page generation request from a user selecting a link corresponding to the page having the image and the main text;
determining performing the auto scroll when the referrer includes the page search site;
performing the auto scroll of the page by adding a parameter to a URL of the page, wherein the page is auto scrolled based on the parameter in the URL.

11. A device for performing an auto scroll of a page, comprising:
a processor configured to read a referrer from a source code of the page, the page having image data and text data, each of the image data and the text data being located at the respective regions of the page; and
to determine whether the referrer includes a character string indicating a page search site, the page search site indicating that the page having the image data and the text data is generated through a page generation request from a user selecting a link corresponding to the page having the image and the main text;
determine performing the auto scroll when the referrer includes the page search site; and
perform the auto scroll of the page by adding a parameter to a URL of the page, wherein the page is auto scrolled based on the parameter in the URL.

\* \* \* \* \*